June 17, 1952     J. V. DRUM     2,600,741
WHEEL-HANDLING DEVICE
Filed May 17, 1949     2 SHEETS—SHEET 1
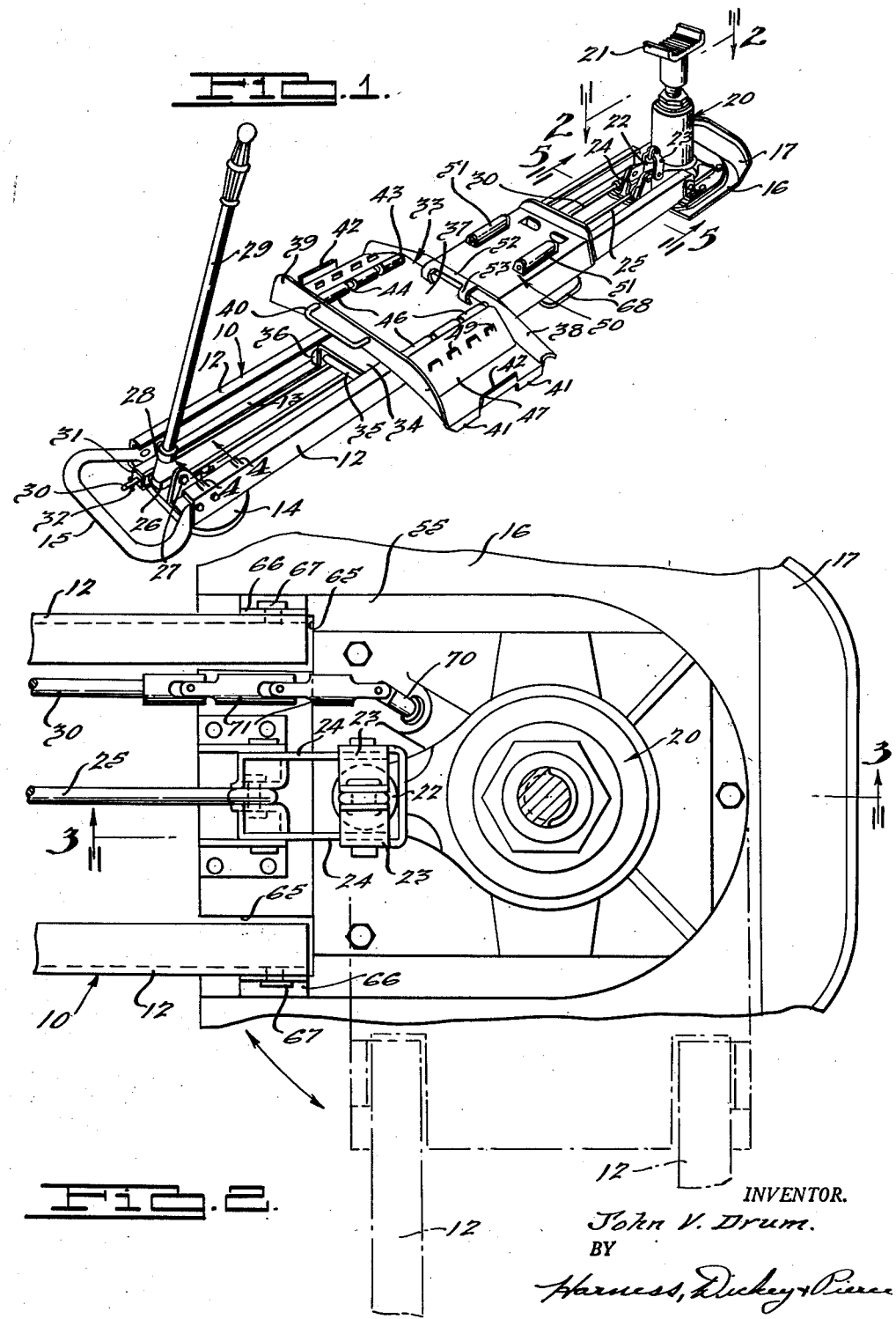
INVENTOR.
John V. Drum.
BY
Harness, Dickey & Pierce
ATTORNEYS.

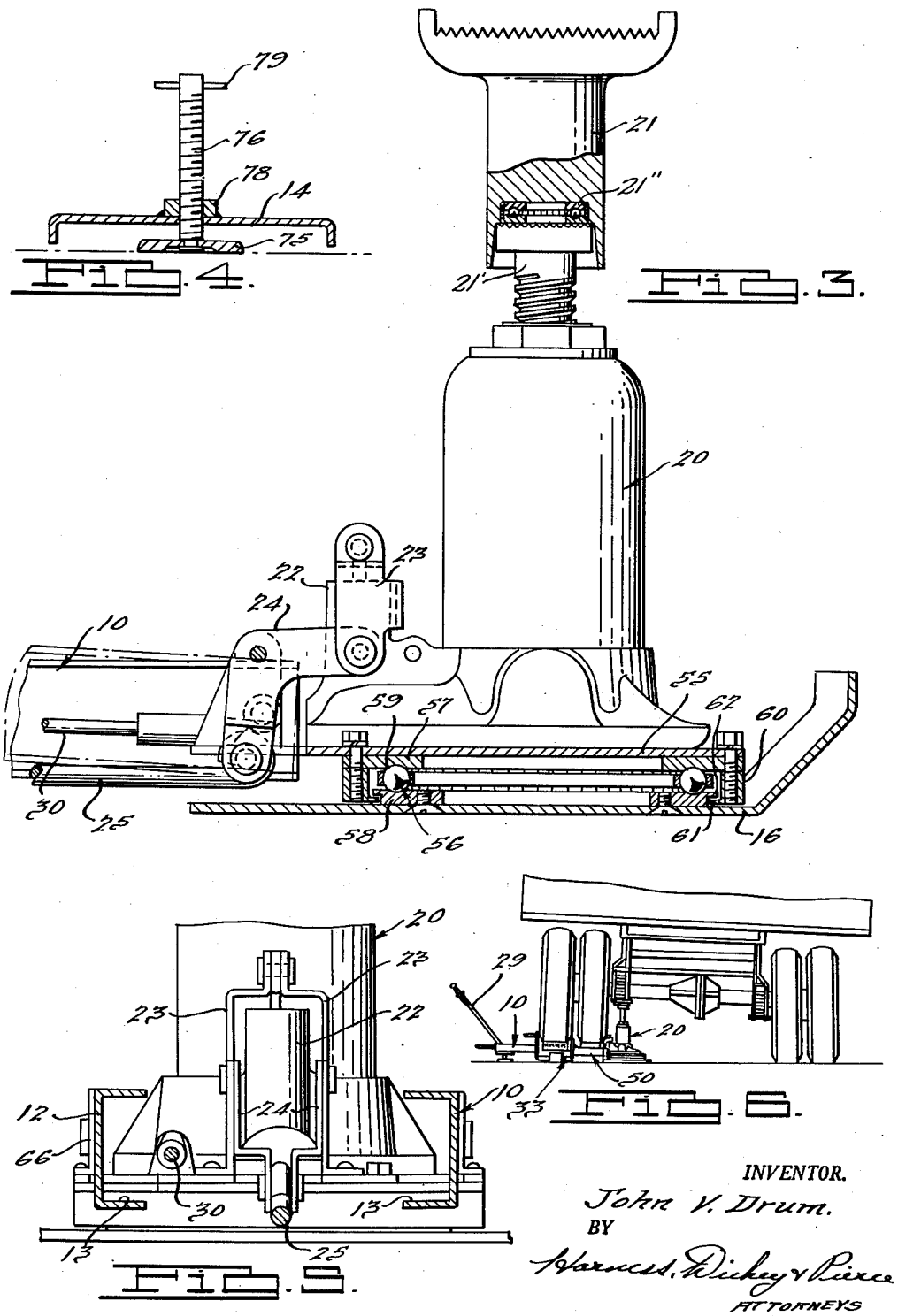

Patented June 17, 1952

2,600,741

UNITED STATES PATENT OFFICE 2,600,741

WHEEL-HANDLING DEVICE

John V. Drum, Grosse Pointe, Mich., assignor to The Drum Corporation, Detroit, Mich., a corporation of Michigan Application May 17, 1949, Serial No. 93,810

9 Claims. (Cl. 214—1)

1

The present invention relates to wheel-handling devices, and particularly relates to improvements in the wheel-handling devices of the type disclosed in the copending application of John V. Drum, Serial No. 772,073, filed September 4, 1947.

The handling of large truck and tractor wheels, when it becomes necessary to remove or change the wheels, has presented a difficult problem. In the copending application of John V. Drum above referred to, a device is disclosed and claimed by which the truck or tractor axle may be raised and the wheel removed with safety, in that the operator can perform all of the necessary steps alone from a remote position without having to get under the vehicle. A unitary device is provided which includes an elongated trackway having a jack at one end, a jack control at the other end, and a movable tire-supporting saddle mounted on the trackway between the ends. The tire-supporting saddle extends transversely of the trackway and is constructed so that it may tilt as the wheel of the truck is moved onto it. In the use of the wheel-handling device disclosed and claimed in the above-referred to application, the device is placed adjacent the wheel to be changed, and the truck or tractor is then moved onto the wheel-supporting saddle. Thereafter, the jack is actuated to engage the vehicle and raise the frame so that the weight of the wheel is supported on the carrier.

Often it is difficult to move the vehicle so as to place the wheel on the handling device because of ground conditions, or broken axles, so that according to the present invention an improved wheel-handling unit is provided in which the axle or other underpart of the truck may first be engaged by the jack and raised, so that the wheel is off the ground, and thereafter the carriage may be pivoted or swiveled about the jack to a position under the wheel. The wheel is then supported on the carriage and removed. Also, when the vehicle is raised, the axle is sometimes at an inclination with respect to the ground. By the structure of the present invention, the trackway may be supported at the same angle as the axle, and when the wheel is pulled away from the axle there is no binding action.

One of the primary objects of the present invention is to provide a wheel-handling unit which can be operated remotely to get under the truck, raise it, and then get under the wheel to support the wheel after the truck has been raised.

2

A further object of the invention is to provide an improved wheel-handling device in which, after the truck axle has been raised and is at an angle with respect to the ground, the trackway carrying the wheel support can be disposed at an angle substantially parallel to the angle of the axle, so that the wheel may be pulled off the axle without binding.

Other objects of the invention will become apparent from the following specification, the drawings relating thereto, and from the claims hereinafter set forth.

In the drawings in which like numerals indicate like views throughout:

Figure 1 is a perspective view of a wheel-handling device embodying features of the present invention;

Fig. 2 is an enlarged partial plan view, taken substantially along the line 2—2 of Fig. 1;

Fig. 3 is a cross-sectional view, with parts in elevation, taken substantially along the line 3—3 of Fig. 2;

Fig. 4 is an enlarged cross-sectional view, taken substantially along line 4—4 of Fig. 1;

Fig. 5 is an enlarged cross-sectional view, taken substantially along the line 5—5 of Fig. 1; and Fig. 6 is a rear elevational view of a dual-wheel truck illustrating one use of the present invention.

The changing of large vehicle wheels and tires, such as truck, trailer and tractor wheels, has been a difficult operation in that the wheels are so large and heavy that they are difficult to handle. It is particularly difficult for one man to effect a wheel removal or change, and when it is attempted there is considerable danger of injury. With the device of the present invention, a unit is provided by which, from a remote position, one man may raise the vehicle and thereafter position the wheel-handling device under the raised wheel for relatively easy removal. This may be accomplished under conditions where it is impossible to move the truck, and under conditions where the truck axle may be broken. Furthermore, the trackway for the carrier may be disposed at substantially the same angle as the angle of the axle so that the wheel may be pulled off the axle without binding.

Referring to the drawings, the wheel-handling device comprises an elongated base, generally indicated at 10. The base 10 includes a pair of facing side members 12 which are channel-shaped in cross section, and provide a pair of facing trackways 13. The outer ends of the channel members 12 are fixed to a transversely extending base member 14 in properly spaced relationship by welding or the like. A handle 15 is suitably connected to the outer ends of the channel members 12 by means of bolts.

The opposite or inner ends of the members 12 are pivotally connected to plate member 55 which in turn is swively supported on the base plate 16 as is more fully described below. Plate member 16 has the inner end thereof disposed upwardly, as indicated at 17, to form a skid so that the unit may be moved along the ground.

A jack, generally indicated at 20, is mounted on the plate member 16 for swivel movement with respect thereto adjacent the inner ends of the trackways 12, the member 16 thus providing a stationary base for the jack. The jack per se may be of conventional construction and may be either mechanically or hydraulically actuated. For purposes of illustration, the jack 20 is an hydraulic jack.

A jack extension or adapter 21 is mounted on the top of the jack 20 and is adapted to engage either the axle or another suitable part of the underside of the vehicle, such as the differential housing. The jack extension 21 is not part of a conventional jack, but is removably mounted on the top of the vertically movable jack rod 21', which is vertically adjustable by threaded means as is customary in jacks of this type. In particular, jack extension 21 is mounted on the jack rod by means of a thrust bearing 21'' so that in operation, as described below, the extension 21 and the plate member 16 can remain as fixed or anchored parts while the jack body and the base 10 swivels as a unit therebetween.

The jack rod extends into the jack cylinder, and is raised through the action of a reciprocating pump 22 which is connected through suitable linkage 23 with bell crank arms 24. The bell crank arms 24 are actuated by a push rod 25 which is pivotally connected to one of the ends thereof, and which extends longitudinally of the base 10 and at the bottom of the trackways 12. The opposite end is pivotally connected to one end of a bell crank socket 26. The bell crank 26 is pivotally connected to brackets 27 and has a socket 28 within which the lower end of an operating handle 29 is received. By reciprocating the handle 29, the push rod 25 is actuated through the bell crank 26 and, in turn, reciprocates the plunger of pump 22 through links 23 and 24 to raise the hydraulic jack. The vehicle is lowered in the usual way by turning a valve in the base of the jack by means of an operating rod 30. The rod 30 also extends parallel to the push rod 25, and is supported on the base 14 by means of a bracket 31. A finger pin 32 extends through the projecting end of the rod 30 and by turning the rod 30 the jack valve is actuated so that it may be lowered.

In the embodiment of the invention illustrated, a dual-wheel support is shown on the trackway but it is to be understood that under some circumstances only one wheel support is necessary.

One of the wheel supports is generally indicated at 33, and is illustrated as the same construction as that described and claimed in the copending application of John V. Drum, filed concurrently herewith.

The wheel support 33 comprises a carriage 34 which is in the form of an inverted channel section having a pair of longitudinally-spaced, transversely extending shafts 35 extending through aligned openings in the depending flanges thereof and adjacent the ends, and projecting beyond the sides of the flanges. The shafts 35 have rollers 36 journalled on the ends thereof, and the rollers 36 are received within the trackways 13 for mounting the carriage 33 for movement along the ground support, or base 10.

A wheel supporting bottom member 37 in the form of a saddle open at its ends is mounted on the carriage 34. The support 37 comprises a transversely extending member which is secured to the top of the carriage 34 by means of rivets or the like. The ends of the member 37 extend beyond the sides of the base 10 and are inclined downwardly toward the ground.

A rolled bead 38 is formed along the inner end of the member 37 for the purpose of strengthening and stiffening it, and an upstanding side flange 39 is formed along the other side. A handle 40 is mounted on the upstanding side 39.

The projected ends of the member 37 are provided with downwardly directed flanges 41 along the bottom edges thereof. Upwardly directed flanges 42 are formed in the ends between the downwardly directed flanges 41. The purpose of such flanges is described in the copending application referred to.

Roller means are mounted on the top surface of the member 37, and such roller means include upstanding brackets 43 which are welded to the top surface of the member 37 and which support a roller shaft 44 therein. Intermediate reinforcing brackets are also welded to the top surface of the member 37 intermediate the ends of the shaft 44 and serve to support such shaft intermediate its ends.

Rollers 46 are rotatably mounted on the shafts 44. Roller guards 47, in the form of transversely extending plates, are mounted on the member 37 by means of brackets on the leading or entering side of their respective rollers 46, and are positioned to protect the rollers as the wheels are rolled on to the central supporting position of the saddle 33. The guards 47 have outstruck tabs 49 thereon which extend outwardly and upwardly, and which provide gripping projections for the wheel tire as it is rolled up over the guard 47.

The wheel-supporting member 33, including the carriage 34 and the wheel-supporting member 37, may be moved longitudinally of the base by engagement of the rollers 36 in the trackway 13. A pull rod having a hook in the end may be employed for moving the unit 33 by engaging the handle 40.

A second wheel-supporting carriage, generally indicated at 50, may also be mounted on the base 10 for movement therealong. Wheels similar to the wheels 36 may be mounted or fixed on the underside of the carriage 50 through a member corresponding to the carriage 34, which is secured to the underside thereof. Rollers 51 are pivotally mounted to brackets on the top surface of the carriage 50 so as to rotatably support a wheel thereon.

So that the carriages 33 and 50 may be moved together, a rolled flange 52 is formed along one edge of the carriage 50 and has downwardly curved tabs 53 which are adapted to hook over the rolled flange 38 and pass into slots formed in the member 37.

As mentioned above, the jack 20 is mounted on the jack base or skid 16 for swivel movement with respect thereto. The elongated base 10 is pivotally connected to the jack 20 so that it swivels with the jack 20 with respect to the base 16, and also may be pivoted about a horizontal axis with respect to the jack 20 and the base 16 so that the trackway may be disposed at an incline to the ground. The operating connection between the jack and the jack-operating elements mounted on the trackway is such that the vehicle may be raised or lowered through operation of the handle 29, regardless of the swiveled position of the trackway and vehicle with respect to the base 16.

The bottom casing of the jack 20 supports the jack cylinder, as well as the pump 22. The jack unit 20 is suitably fixed to a plate member 55. The plate member 55 in turn is mounted on the jack base 16 through a thrust bearing, generally indicated at 56. The thrust bearing 56 includes a top race 57, a bottom race 58, and ball bearings 59 interposed therebetween. The ball bearings 59 may be mounted in a suitable cage. The lower race 58 is suitably fixed to the top surface of the base 16; and the upper race 57 is connected to the plate 55. In order to prevent separation of the upper and lower races, a ring 60, having an inwardly directed annular flange 61, is fixed to the upper race 57 with the flange 61 disposed under an outwardly directed annular flange 62 formed adjacent the top of the lower race 58. Clearance is provided between the flanges 61 and 62 to permit relative movement therebetween, but the clearance is such as to prevent undue separation of the races.

The elongated base 10 is pivotally connected to the plate 55, so that the base 10 may be pivoted about a horizontal axis with respect to the plate 55, and the jack 20, but may swivel therewith with respect to the jack base 16. The plate 55 is provided with cutaway slots 65 in the edge adjacent the base 10, and the ends of the trackways 12 are received within such slots 65. Upstanding brackets 66 are fixed to the top of plate 55, adjacent the outer edges of the slots 65, and the inner ends of the trackways 12 are pivoted to the upstanding flanges of the brackets 66 by means of pivot pins 67.

The trackways 12 are braced and held in proper spaced relationship with respect to each other by means of an under plate 68 which is disposed intermediate the ends of the trackways, and preferably closer to the inner ends thereof.

The inner end of the jack release rod 30 is connected to the vehicle release valve 70 through a universal joint 71 so that the release rod may be actuated regardless of the pivotal position of the base 10 with respect to the jack. The push rod 25 is pivotally connected to the lower ends of the bell cranks 24 so that the operating handle 29 may be actuated regardless of the pivotal position of the base with respect to the jack.

In the operation and use of the wheel-handling unit above described, the unit may be moved in under the truck from the rear to such position that the jack is disposed under the axle, the differential housing, or other part of the vehicle on the underside to be engaged for raising. While the unit is in this position, the operator may then actuate the handle 29 to raise the wheels. In the illustration in Fig. 6, the jack is in engagement with the axle. Thereafter, the base 10 may be swiveled about the vehicle base 16 to such a position that the carriages 33 and 50, or one of them in the case of a single wheel truck, are positioned under the wheels, or wheel, to be removed. It will be noted that during this swivelling action jack extension 21 and base member 16 will remain as fixed or anchored points, the jack body and its connected parts swivelling therebetween as a unit by virtue of bearings 21'' and 56. The wheel may then be unfastened from the axle and is then supported on the carriage. The carriage may then be pulled outwardly of the base 10 and whatever repair is necessary made to the wheel, brake, or other part of the vehicle which necessitated the removal of the wheel. The wheel is then replaced on the carriage and moved back into its position on the axle and re-applied.

As shown in Fig. 6, when one side of the axle is raised, it is at an angle with respect to the ground. According to the present invention, means are provided on the base 10 for adjusting the height of the outer end of the base 10 so that the trackway may be placed in substantially the same angle as that of the axle to facilitate in the removal of the wheel without binding. This is accomplished by the provision of a ground-engaging member 75 which is disposed under the plate 14, and which is connected to the plate 14 through a screw 76 which is threadably received in a nut 78 welded to the top surface of the plate 14. The screw extends through an opening in the plate and is pivotally connected to the base 75. A hand or thumb rod 79 is passed through an opening in the top of the screw 76 to facilitate the turning of it. By turning the screw 76, it will be appreciated that the plate 14 and the outer end of the base 10 may be raised or lowered with respect to the ground. This raising and lowering is permitted by the pivot connection between the base 10 and the plate 55.

Formal changes may be made in the specific embodiment of the invention above described without departing from the spirit and scope of the appended claims.

What is claimed is:

1. A wheel-handling device comprising an elongated base, a wheel support on said base and adapted to engage the bottom of a wheel, means mounting said support on said base for movement therealong, a lifting jack adjacent one end of said base, a jack base, means providing a swivel mounting between said jack and said jack base, means connecting said elongated base to said jack, and means on said elongated base remote from said jack and operatively connected thereto for operating said jack.

2. A wheel-handling device comprising an elongated base, means forming a trackway along said base, a wheel support on said base, means mounting said support on said base for movement therealong, a lifting jack adjacent one end of said base, a jack base, means providing a swivel mounting between said jack and said jack base, means connecting said elongated base to said jack for swivel movement therewith with respect to said jack base and for pivotal movement with respect to said jack, and means on said elongated base remote from said jack and operatively connected thereto for operating said jack.

3. A wheel-handling device comprising an elongated base, means forming a trackway along said base, a wheel support on said base, means mounting said wheel support on said base for movement therealong, a lifting jack adjacent one end of said base, means pivotally connecting said elongated base to said jack, means on said elongated base remote from said jack and operatively connected thereto for operating said jack, and adjustable ground-engaging means on the end of said base remote from said jack to adjust the inclination of the base about the pivotal connection of the base with the jack.

4. A wheel-handling device comprising an elongated base, means forming a trackway along said base, a wheel support on said base, means mounting said wheel support on said base for movement therealong, a lifting jack adjacent one end of said base, a jack base, means providing a swivel mounting between said jack and said jack base, means connecting said elongated base to said jack for swivel movement therewith with respect to said jack base and for pivotal movement with respect to the jack, means on said elongated base remote from said jack and operatively connected thereto for operating said jack, and adjustable ground-engaging means on the end of said elongated base remote from said jack to adjust the inclination of the elongated base about the pivotal connection of the elongated base with the jack.

5. A wheel-handing device comprising an elongated base, a wheel support on said base and adapted to engage the bottom of a wheel, means mounting said support on said base for movement therealong, a lifting jack adjacent one end of said base, a jack base, thrust bearing means providing a swivel mounting between said jack and said jack base about an axis substantially perpendicular to said base, means connecting said elongated base to said jack, and means on said elongated base remote from said jack and operatively connected thereto for operating said jack.

6. A wheel-handling device comprising an elongated base, means forming a trackway along said base, a wheel support on said base, means mounting said support on said base for movement therealong, a lifting jack adjacent one end of said base, a jack base, means providing a swivel mounting between said jack and said jack base, means connecting said elongated base to said jack for pivotal movement therewith with respect to said jack base and for pivotal movement with respect to said jack, and means on said elongated base remote from said jack and operatively connected thereto for operating said jack, said last named means being movable with said elongated base and jack when said jack is swiveled with respect to said jack base.

7. A wheel-handling device comprising an elongated base, means forming a trackway along said base, a wheel support on said base, means mounting said wheel support on said base for movement therealong, a ground-engageable skid adjacent one end of said base, a lifting jack mounted on said skid, means providing a swivel mounting between said jack and said skid, means pivotally connecting said elongated base to said jack, means on said elongated base remote from said jack and operatively connected thereto for operating said jack, and adjustable ground-engaging means on the end of said base remote from said jack to adjust the inclination of the base about the pivotal connection of the base with the jack.

8. A wheel-handling device comprising an elongated base, means forming a trackway along said base, a wheel support on said base, means mounting said wheel support on said base for movement therealong, a lifting jack adjacent one end of said base, a skid, means providing a swivel mounting between said jack and said skid, means connecting said elongated base to said jack for swivel movement therewith with respect to said skid and for pivotal movement with respect to the jack, means on said elongated base remote from said jack and operatively connected thereto for operating said jack, and adjustable ground-engaging means on the end of said base remote from said jack to adjust the inclination of the base about the pivotal connection of the base with the jack.

9. A wheel-handling device comprising an elongated base, a wheel support on said base and adapted to engage the bottom of a wheel, means mounting said support on said base for movement therealong, a lifting jack adjacent one end of said base, a jack base, means providing a swivel mounting between said jack and said jack base, a load-engaging element carried by said jack and having a swivel connection therewith, means connecting said elongated base to said jack, and means on said elongated base remote from said jack and operatively connected thereto for operating said jack.

JOHN V. DRUM.

REFERENCES CITED

The following references are of record in the file of this patent:

UNITED STATES PATENTS

| Number | Name | Date |
| --- | --- | --- |
| 912,062 | Bendle | Feb. 9, 1909 |
| 1,264,261 | Blankenship | Apr. 30, 1918 |
| 2,053,646 | Whalen | Sept. 8, 1936 |
| 2,173,598 | Sonderup | Sept. 19, 1939 |
| 2,497,960 | Salzmann | Feb. 21, 1950 |